(12) United States Patent
Tsubaki et al.

(10) Patent No.: US 6,997,499 B2
(45) Date of Patent: Feb. 14, 2006

(54) FEEDER ASSEMBLY OF VEHICLE SLIDING SEAT

(75) Inventors: Akira Tsubaki, Shizuoka (JP);
Hiroyuki Wakamatsu, Aichi (JP);
Hirofumi Wada, Kagoshima (JP);
Tadashi Muraoka, Kagoshima (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/885,699

(22) Filed: Jul. 8, 2004

(65) Prior Publication Data

US 2005/0035622 A1 Feb. 17, 2005

(30) Foreign Application Priority Data

Aug. 13, 2003 (JP) ............................. 2003-292898

(51) Int. Cl.
*B60N 2/02* (2006.01)
(52) U.S. Cl. .................... 296/65.13; 174/72 A; 439/34
(58) Field of Classification Search ............. 296/65.13, 296/65.01, 193.07
See application file for complete search history.

(56) References Cited

U.S. PATENT DOCUMENTS

| 5,048,886 | A | * | 9/1991 | Ito et al. .................. 296/65.14 |
| 5,879,047 | A | * | 3/1999 | Yamaguchi et al. ..... 296/146.7 |
| 5,924,515 | A | * | 7/1999 | Stauffer ....................... 180/326 |
| 6,036,157 | A | * | 3/2000 | Baroin et al. ............... 248/429 |
| 6,267,430 | B1 | * | 7/2001 | Cresseaux ................ 296/65.13 |
| 6,511,032 | B1 | * | 1/2003 | Lee .......................... 296/65.13 |
| 6,809,264 | B2 | * | 10/2004 | Watanabe et al. ......... 174/72 A |
| 2004/0017648 | A1 | * | 1/2004 | Tsubaki ...................... 361/601 |
| 2004/0239086 | A1 | * | 12/2004 | Ventura et al. ............. 280/735 |

FOREIGN PATENT DOCUMENTS

| JP | 10-112922 | | 4/1998 |
| JP | 2003335188 | A * | 11/2003 |
| JP | 2004064815 | A * | 2/2004 |
| JP | 2004112984 | A * | 4/2004 |

* cited by examiner

*Primary Examiner*—Kiran B. Patel
(74) *Attorney, Agent, or Firm*—Armstrong, Kratz, Quintos, Hanson & Brooks, LLP

(57) ABSTRACT

A feeder assembly 1 of a sliding seat comprising a case 2 having a harness receiving section 6, a movable portion 3 moving along the case, and a wiring harness 4, bent in the harness receiving section, supported one end by the movable portion and other end by the case, wherein a slit 10 is formed in the case 2 for the insertion of the movable portion 3, a foreign substance invasion space 53 is formed between the case 2 and a case bottom 11, and the space is isolated from the harness receiving section by partition walls 14 and 15. A foreign substance discharge hole 12 is disposed at the case bottom 11. The movable portion comprises a harness pathway 21 to make each electric wire 4a of the wiring harness 4 arrange flatly in parallel, and a harness holder 22 which bundles each electric wire in circular cross-section following the harness pathway. A clearance is disposed between the movable portion and the case so that the movable portion 3 positions with non-contact or almost non-contact of the case 3.

7 Claims, 8 Drawing Sheets

FEEDER ASSEMBLY OF VEHICLE SLIDING SEAT

BACKGROUND OF THE INVENTION

1. Field of the Invention

The present invention relates to a feeder assembly of a vehicle sliding seat for supplying electric power to auxiliary units in the vehicle sliding seat, aiming the prevention of foreign substance invasion and the smoothness of the sliding movement.

2. Related Art

A seat of a vehicle is provided with various auxiliary units such as a motor for sliding drive, a crew member detection sensor, and a heater. Various feeder assemblies of sliding seat have been proposed.

FIGS. 11 and 12 show a conventional example of feeder assembly of a vehicle sliding seat. (refer to patent document 1)

The feeder assembly 61 is provided with a generally rectangle pipe case 62, a slider 63 moving in the seat sliding direction of the case 62, and a flat harness 64. The flat harness is supported by the slider 63 at one end and fixed by the case end at the other end, bent to generally U-shaped in the case.

The case 62 has a slit 65 for the insertion of the inner side portion of the slider 63 in an upper wall 66, and the slit 65 is covered by a top wall 75, and is hidden from the exterior. The flat harness 64 is arranged longitudinally, one end following to a slider-side connector and the other end following to a fixed-side connector of the case end. The slider-side connector 67 is connected to each auxiliary unit of the seat side through a harness 74 (FIG. 12). The case-end connector 68 is connected to the power supply or the switch through harness (not shown).

In FIG. 12, the numeral 69 shows a seat, 70 shows a vehicle body, 71 shows a guide rail, 72 shows a roller part engaging free slide in the guide rail 71, and 73 shows foaming material, such as urethane, respectively.

Patent document Published Patent Application: H10-112922 (page 3 to 4, FIGS. 3 to 5)

However, even the labyrinth is constituted from the top wall 75 and the upper wall 66 of the case 62 in the aforesaid conventional feeder assembly 61 for sliding seat, when the occupants spill juice and confectionery or the sand of a sole falls, there is not necessarily a fear of these foreign substances invading in the case from the slit 65 through between the top wall 75 and the upper wall 66 of the case 62. Moreover, since the upper wall 66 and top wall 75 of the case 62 are formed in complicated shape and the holding of the flat harness by the slider 63 makes the structure complicated, there is concern about high cost in parts. Moreover, the use of the flat harness 64 as a circuit body makes the parts cost high and the limitation of the number of circuits causes a problem to narrow the versatility for every type of a vehicle. Since the wiring harness 74 is connected between the seat 69 and the case 62, the wiring harness 74 is stretched and bent to the bending direction and there is also concern about the short life of the wiring harness 74.

SUMMARY OF THE INVENTION

In view of the aforementioned disadvantages, the present invention is to provide a feeder assembly of a vehicle sliding seat which certainly prevents the invasion of foreign substances, such as juice and sand, with a simple structure, low cost and high versatility for every type of a vehicle, and also prevents the damage of wiring harness due to the sliding operation.

For achieving the object, a feeder assembly of a vehicle sliding seat comprising a case having a harness receiving section, a movable portion moving along the case, and a wiring harness bent inside of the harness receiving section which one end is supported by the movable portion and the other end is supported by the case, characterized in that a slit is formed in the case for the insertion of the movable portion, a foreign substance invasion space is formed between the slit and a case bottom, and the foreign substance invasion space is isolated from the harness receiving section through a partition wall.

This configuration makes foreign substances invaded into the slit, such as juice or sand, fall along the partition wall and pile up at the case bottom. Since the harness receiving section and the foreign substance invasion space are separated by the partition wall, the foreign substance piled up in the case bottom is prevented from invading into the harness receiving section. The wiring harness is lead along the movable portion, connected with the sliding seat side circuit, and connected with the circuit of a power supply through the case. The movable portion moves simultaneously with the movement of the sliding seat. The feeder assembly of the sliding seat is constructed with a simple structure from the case, the movable portion, and the wiring harness having a plurality of wires.

Preferably, the feeder assembly further comprises a hole for foreign substance ejection at the case bottom.

Thereby, the foreign substance felt at the case bottom is immediately discharged outside from the hole. Therefore, the foreign substance invasion space is not filled with foreign substances.

Preferably, the partition wall comprises an upper and lower partition wall, and a second slit is formed for the insertion of the movable portion between each partition wall.

Thereby, the movable portion with bent shape is inserted into the case inside through the first slit and the second slit. The foreign substance invading directly from the first slit is prevented by the upper partition wall. The foreign substance falls to the case bottom along the upper and lower partition walls. The case bottom does not mean the lowest portion of the case, but the bottom of the foreign substance invasion space.

Preferably, the movable portion comprises a harness pathway making each electric wire of the wiring harness arrange flatly in parallel, and a harness holder bundling each electric wire in circular cross-section, following the harness pathway.

Thereby, by arranging the usual insulated covering electric wire in parallel with the harness pathway, each slit of the case for the insertion of the harness pathway can be made narrower so that the invasion (probability) of the foreign substance from the slit is suppressed as much as possible. Moreover, by arranging each electric wire as the wiring harness of circular cross-section in the harness receiving section, the wiring harness can be made smoothly bent in the J-shaped or U-shaped character in the harness receiving section by the rigidity (restoring property).

Preferably, the slit is provided between the movable portion and the case, making that the movable portion is positioned to the case by non-contact or almost non-contact.

Thereby, the friction between the movable portion and the case (sliding resistance) on the movement of the sliding seat is suppressed very low. The wear of the movable portion and the case is prevented.

Preferably, a movable portion is engaged to the sliding seat, capable of moving freely in the slit perpendicularly to the sliding direction.

Thereby, the position slippage of the movable portion is freely absorbed in the case width direction, the sliding friction between the movable portion and the case is suppressed very low.

Then, the harness portion between the sliding seat and the movable portion is prevented from a large tension in bent direction and the wear of the movable portion and the case is prevented.

Preferably, a claw is disposed at both side of the case, stabbed into the filler of the vehicle floor for fixing.

Thereby, the claw stabbed in the filler prevents the inward deformation of the case on the loading to the vehicle or with time, the contact between the movable portion and the case is suppressed as much as possible, and the gap between the moving part and the case is guaranteed over a long period of time. Moreover, the fixing of the case to the body side is performed easily, and the workability of the case assembly improves.

DETAILED DESCRIPTION OF THE PREFERRED EMBODIMENTS

Referring to the accompanied drawings, an embodiment of the present invention will be discussed in detail.

Figure 1:
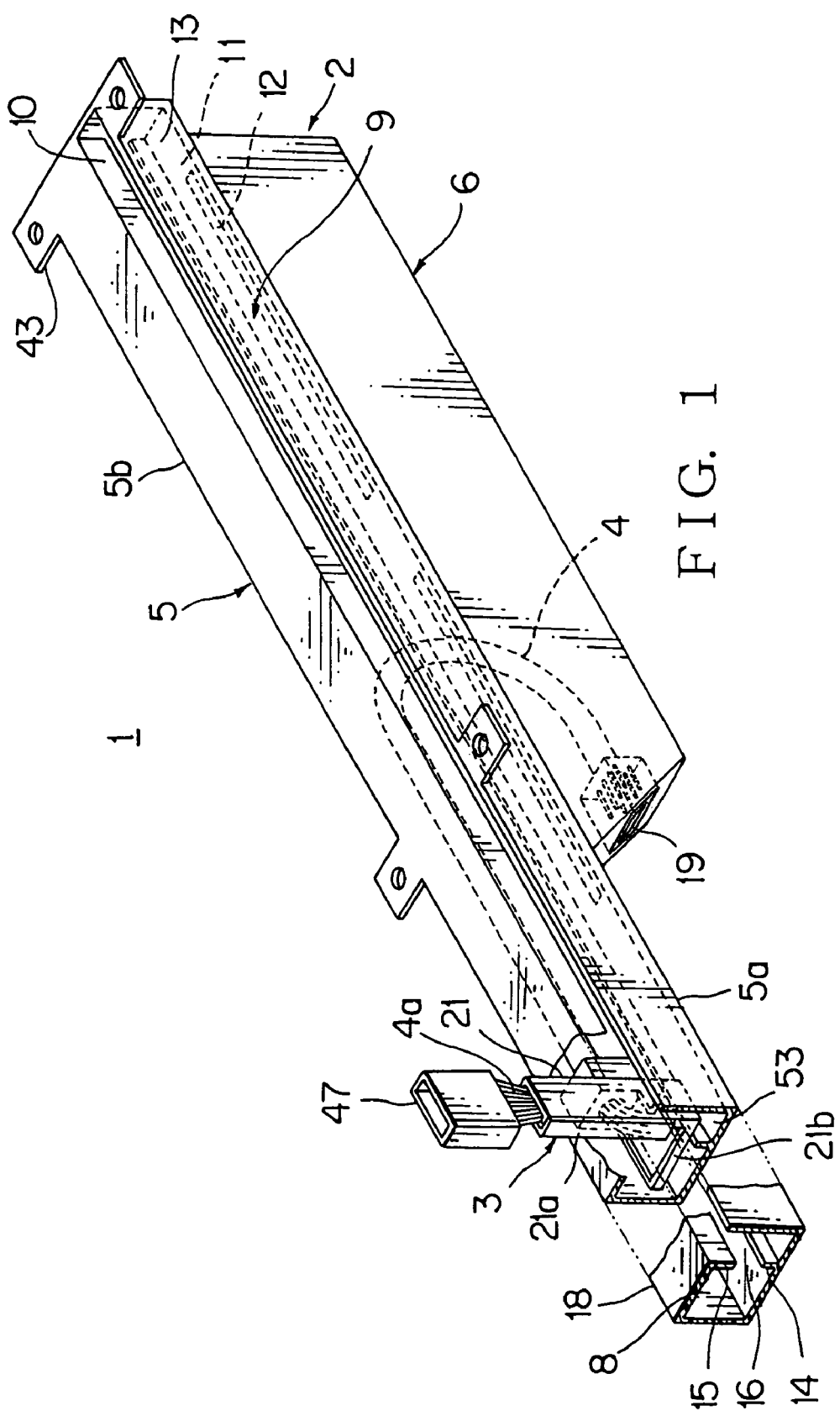
FIG. 1 is a whole perspective view of a part showing a embodiment of the feeder assembly of a sliding seat according to the present invention.
Figure 2:
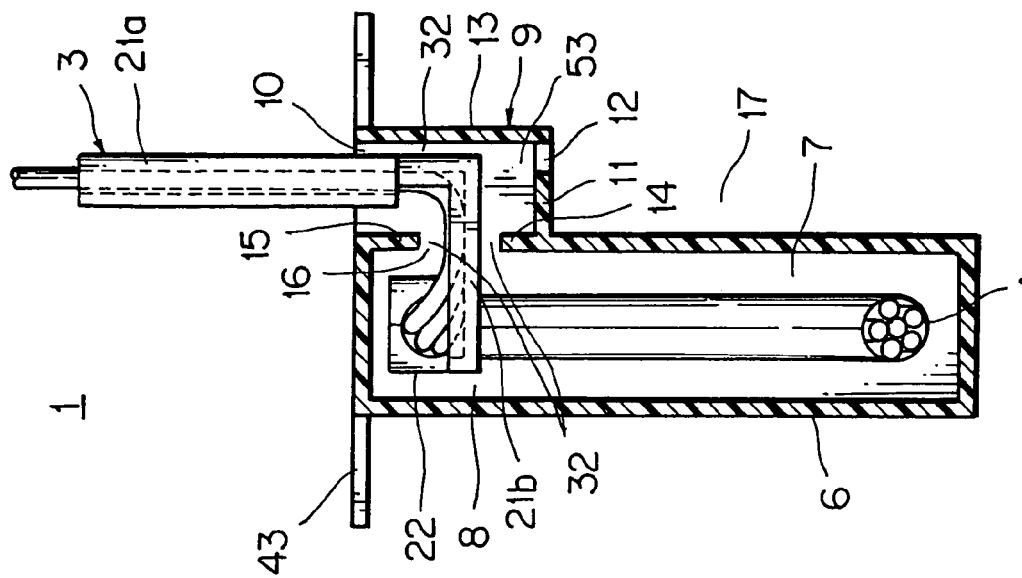
FIG. 2 is a longitudinal sectional view showing the feeder assembly of a sliding seat.

FIGS. 1 and 2 shows an embodiment of the feeder assembly of a vehicle sliding seat according to the present invention.

The feeder assembly 1 of the sliding seat comprises a case 2 made of a synthetic resin, a movable portion 3 made of a synthetic resin moving in the longitudinal direction of the case 2, a wiring harness 4 consisting of a plural of covered electric wires connecting the movable portion 3 and the case end.

The case 2 comprises a sliding portion 5 in generally rectangle pipe shaped, extending long accepting long sliding seat (long sliding stroke seat), and a harness receiving section 6 which is formed in width narrower than the sliding portion 5 and disposed at one side of the sliding portion 5.

The sliding portion 5 comprises a front half part 5a extending in generally rectangle piped shape, and a back half part 5b having a sliding space 8 connecting to a harness receiving section space 7 (FIG. 2) in the harness receiving section 6. The foreign substance discharge portion 9 is formed in the other side of the sliding portion 5, i.e. the opposite side of the offset side of the harness receiving section 6. In addition, the front half part 5a and back half part 5b may become back half part and front half part respectively depending on the attachment direction of the feeder assembly.

The foreign substance discharge portion 9 comprises a first slit 10 for the insertion of the movable portion 3, a hole 12 for foreign substance discharge formed in a bottom wall 11 (case bottom) located in the underside of the slit part 10, a outside vertical tall wall 13 which up-rises from the bottom wall 11 and adjoins the slit 10, a inside vertical low wall 14 (lower partition wall) and a vertical partition wall 15 (upper partition wall) at the upper side of the inside lower wall 14 intervening a second slit 16 for the insertion of the movable portion. The foreign substance invasion space 53 is formed between the bottom wall 11 and the first slit 10.

The lower partition wall 14 prevents the foreign substance dropped to the bottom wall 11 from invading to inside the slit 16, i.e. the harness moving space (referred to as 8) or the harness receiving section 7. Moreover, the upper guard partition wall 15 leads the foreign substance dropped inside the first slit 10 to fall down to the bottom wall 11. An external space 17 (FIG. 2) is located under the bottom wall 11, and the hole 12 for foreign substance discharge is opened to outside. The form of the hole 12 may be slit shape, circular, rectangle or any shapes and the bottom wall 11 (bottom) may be completely opened.

The upper and lower partition walls 15 and 14 follows perpendicularly with the wall part 18 of the U-shaped character cross-sectional view and the harness moving space (8) is formed inside of the wall 18. The harness moving space (8) is a part of the movable portion's moving space 8. That is, the movable portion 3 moves in each space of the inside and outside of the upper and lower partition walls 14 and 15, which is a protection wall for foreign substance invasion. The wiring harness 4 moves in the inside space (8) of the upper and lower partition walls 14 and 15.

The wall 18 of the U-shape follows the harness receiving section under the case 2 at the half back part 5b, and having an opening at the bottom connecting to a space of the harness receiving section 7 (the wall 18 becomes the L-shape wall at the half back of the case and combined to the harness receiving section 6).

The harness receiving section 6 is formed of each wall of the front and rear, the right and left, and the bottom in a generally trapezoid shape in this embodiment. A connector 19 of fixing side is disposed in the front wall and the wiring harness 4 (a plurality of electric wires) is bundled in generally circular cross-section leading to the upper movable portion 3 by bending in generally U- or J-shaped character.

The connector 19 has a plurality of electric terminals in the housing. As for the case 2, for example, it is desirable from a viewpoint of resin fabrication to form the upper wall or the side wall independently and fix them to the case by locking.

Figure 3A:
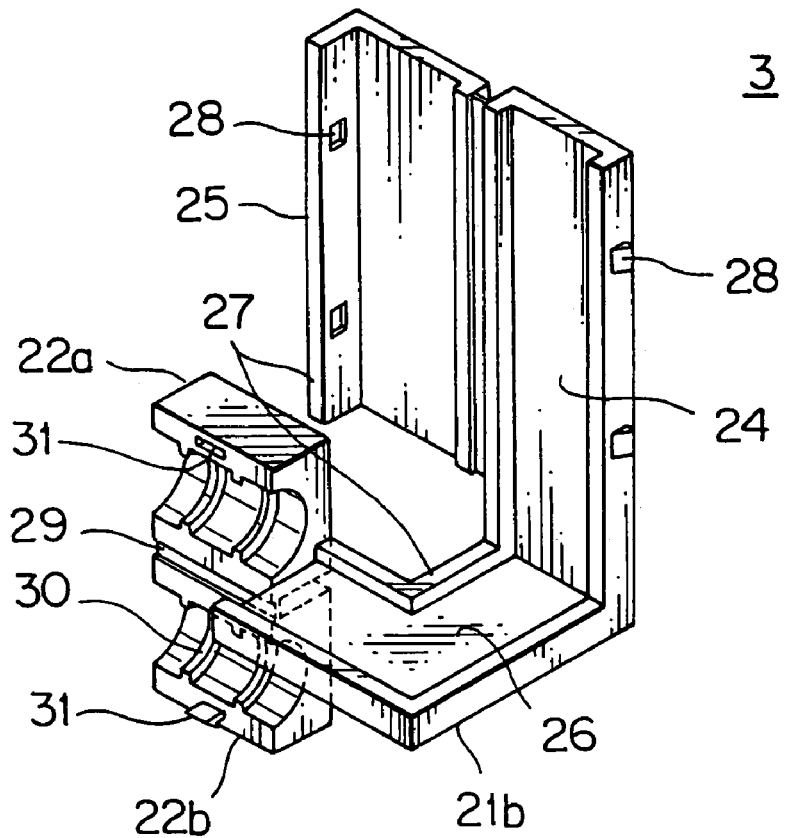
FIGS. 3A and 3B show a perspective development view and a perspective assembly view in an embodiment of the movable portion of the feeder assembly, respectively.
Figure 3B:
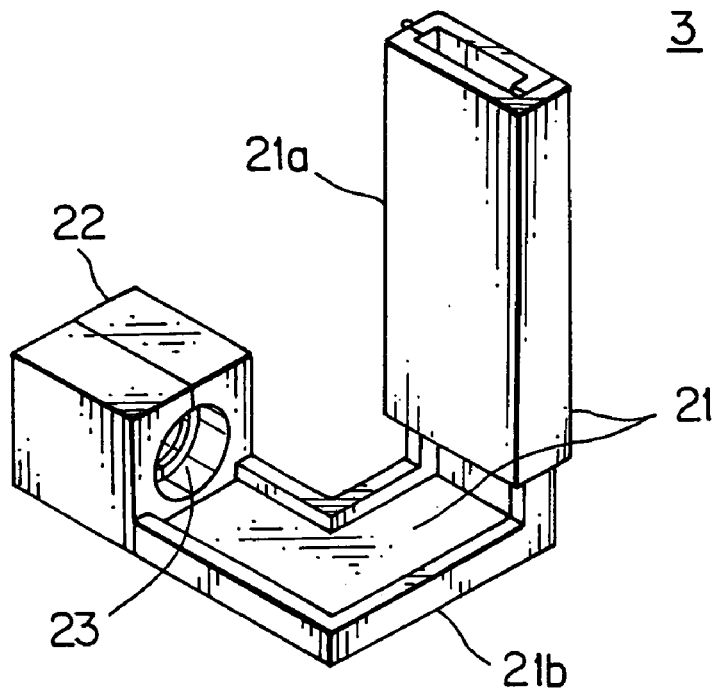

The movable portion 3 as shown in FIGS. 3(a) and 3(b) for an example, comprises a harness pathway 21 of generally L-shaped character cross section (flat) and a harness holder 22 having a insertion hole 23 of circular cross section following the harness pathway 21.

The harness pathway 21 comprises a vertical part 21a and a horizontal part 21b. The vertical part 21a comprises a base 24 and a cover 25, and the horizontal part 21b comprises only a base 26 bending generally L-shaped in a horizontal plane. Each base 24 and 26, and the cover 25 have a low edge wall 27 on both sides of the wall. It is desirable to lock the base 24 and the cover 25 with locking means, such as a projection and a concave. Each covered electric wire 4a (FIG. 1) is arranged flat in parallel at the harness pathway 21. The electric wire 4a of the vertical harness pathway 21a follows a connector 47 (FIG. 1).

A harness holder 22 consists of a pair of split parts 22a and 22b, and the split part 22a follows the horizontal harness pathway 21b in a unit. Preferably, both split parts 22a and 22b are connected by a thin hinge 29 and have a protruded thread inside thereof engaging to the circumference groove of a corrugate tube so that flexible corrugate tube made of a synthetic resin can be supported. Both split parts 22a and 22b are fixed each other by a locking means 31, such as a claw or a hole.

The corrugate tube covers the perimeter of the wiring harness 4 between the fixed side connector 19 of the harness receiving section 6 in FIG. 1 and the harness holder 22. Each electric wire 4a delivered in flat at the harness pathway 21 is bundled with circular cross-section in the harness holder 22. When using a corrugate tube of elliptic cross-section, the insertion hole 23 of the harness holder 22 is formed with the same shape as it.

Preferably, the movable portion 3 is formed with a low sliding frictional resistance material, such as POM (polyacetal). The movable par 3 acts as a harness clamp. In the embodiment in FIG. 2, the clearance 32 is formed between the movable portion 3 and the case 2, and the movable portion 3 is, preferably, does not contact with any parts of the case 2 and is floating.

Figure 4:
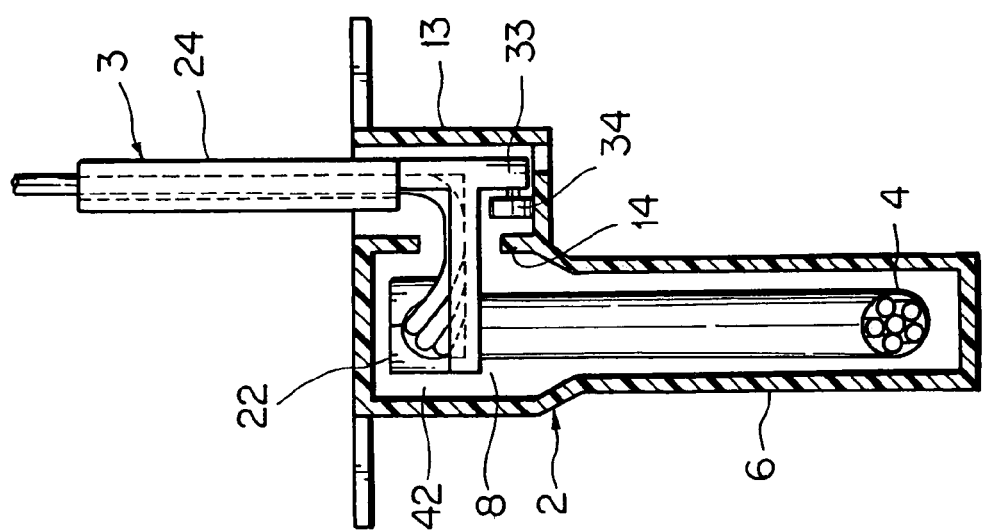
FIG. 4 is a longitudinal sectional view of the first modification of the feeder assembly of the sliding seat.

As another embodiment of the feeder assembly of the sliding seat, as shown in FIG. 4 (The same action part as in FIG. 2 is given the same numeral), a vertical base wall 24 of the movable portion 3 may be extended downward in parallel with the lower partition wall 14 for foreign substance prevention of the case 2 (numeral 33), a roller 34 may be formed in the extended part 33 for free rolling, and the moving space 8 of the case 2 may be formed broadly and the harness receiving section 6 may be formed narrower than the moving space 8 for the movable portion. These constitutions may be adopted independently or may be combined.

It is best from viewpoints of mobility and wear for the movable portion 3 to float without contact to any part of the case 2. However, by the size variation of the long guide rail 36 to which the sliding seat 35 (FIG. 8) is moved, the movable portion 3 may contacts the case 2. For these problems, the extended part 33 (FIG. 4) and the roller 34 may be formed, a sufficient clearance 42 (FIG. 4) between the harness holder 22 of the movable portion 3 and the case 2 may be formed, and then the movable portion 3 can be moved smoothly.

Figure 5:
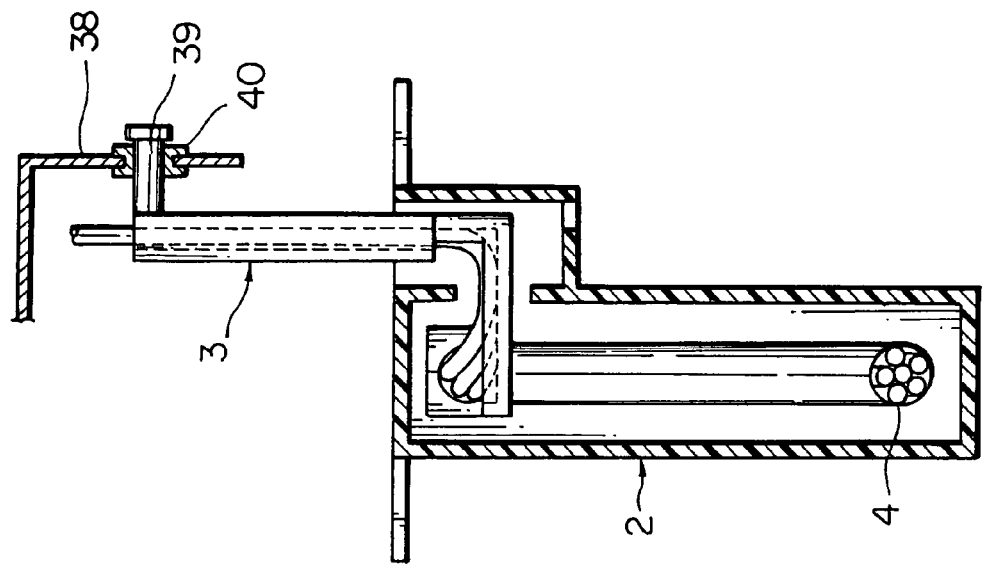
FIG. 5 is a longitudinal sectional view of the second modification of the feeder assembly of the sliding seat.

Moreover, as shown in FIG. 5, the movable portion 3 may be provided with an axial part 39 horizontal to the movable portion 3, thereby capable of moving freely along to the seat width direction for a vertical wall 38 (FIG. 5) of a base 37 in the seat 35 (FIG. 8), and the axial part 39 may be engaged freely along the sliding direction in a hole of the wall 38 through a supporter 40. Thereby, the sliding friction with the movable portion 3 and the case 2 decreases, and the smooth movement of the movable portion 3 is attained.

Figure 6:
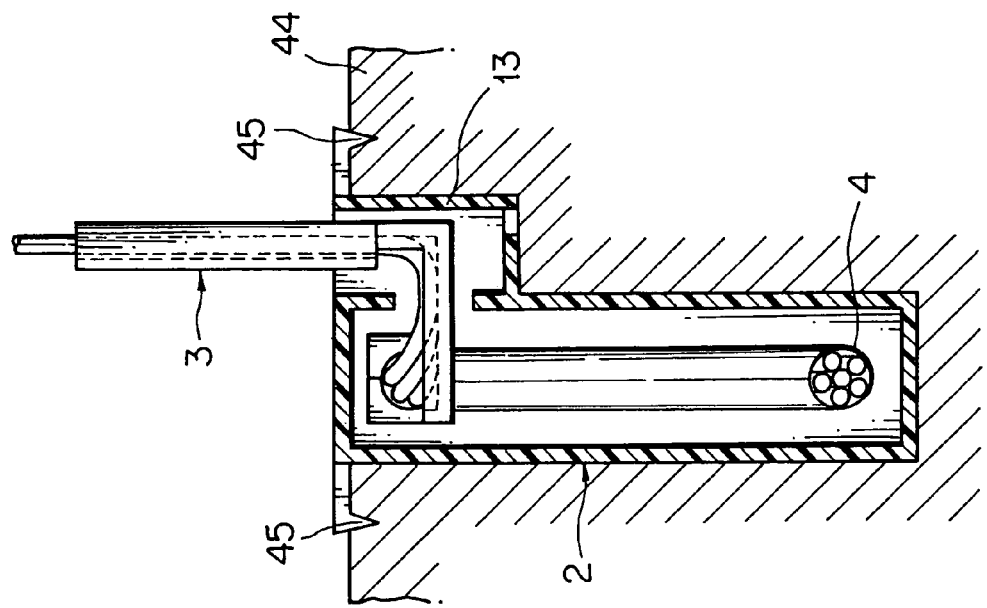
FIG. 6 is a longitudinal sectional view of the third modification of the feeder assembly of the sliding seat.

In the embodiment of FIG. 1, the case 2 is fixed by bolts at a bracket 43 of the both sides of the case width at the vehicle floor. However, for example as shown in FIG. 6, a sharp claw 45 may be disposed in the wall of the both sides of the case width, stabbing into a foaming material (filler) 44, such as styrene filled in the floor bottom. The inner inclined deformation of the case 2 is prevented by the bracket 43 and the claw 45 of both sides of the case, the clearance between the movable portion 3 and the case is kept, and smooth movement of the movable portion 3 is guaranteed.

Figure 7:
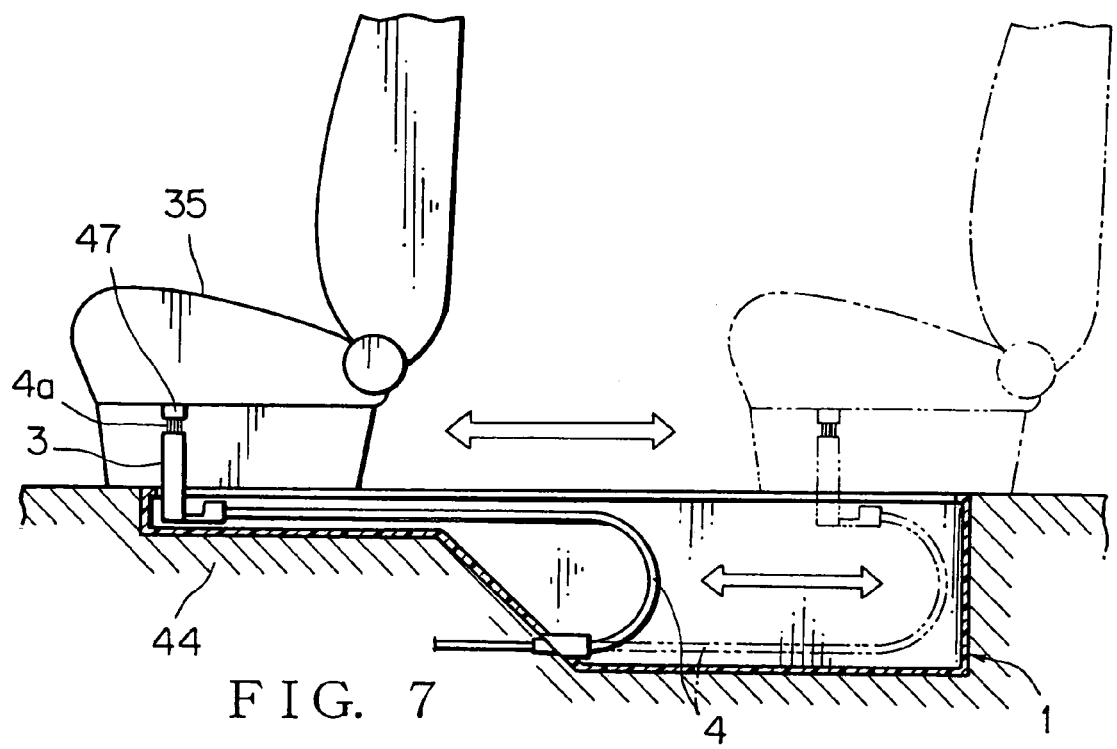
FIG. 7 is a side sectional view of the feeder assembly of a sliding seat arranged in the vertical position at a vehicle floor.
Figure 8:
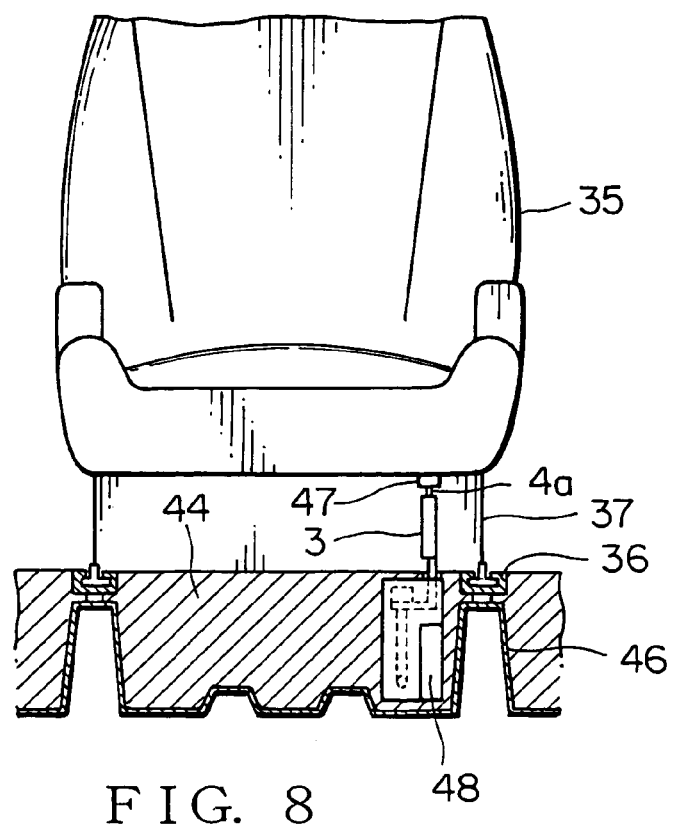
FIG. 8 is a front sectional view of the feeder assembly of a sliding seat arranged in the vertical position at a vehicle floor.

FIGS. 7 and 8 show the example of wearing of the feeder assembly of a sliding seat 1 to a vehicle. The feeder assembly 1 is arranged perpendicularly (vertical) inside (concave) the foaming material 44 of the floor. A solid line shows the advance position of the seat 35, and a dotted line shows the retreat position of the seat 35. The wiring harness inside the case moves with J- or U-shape with the movement of the seat 35. A numeral 36 shows a guide rail and 46 shows a floor panel in FIG. 8.

The wiring harness 4 is led upward from the movable portion 3 in the present embodiment, connecting with the connector 47 of the seat side. Since the movable portion 3 hardly contacts the case 2 as the aforesaid (even if contacting, it slides wit very low friction), with movement of the seat 35, the electric wire 4a between the movable portion 3 and the connector 47 is not subject to a large bending force and is prevented from wear. This effect is further promoted by connecting the movable portion 3 and the connector 47 in a unit. However, the workability to connect the connector 47 to the seat side becomes better when the movable portion 3 and the connector 47 are separated.

As shown in FIGS. 2 and 8, the hole 12 for foreign substance discharge is located under the upward projection 21a (perpendicular harness pathway) of the movable portion 3, the space 48 surrounded by the foaming material 44 is located under the hole 12, and a foreign substance is accommodated in this space 48.

Figure 9:
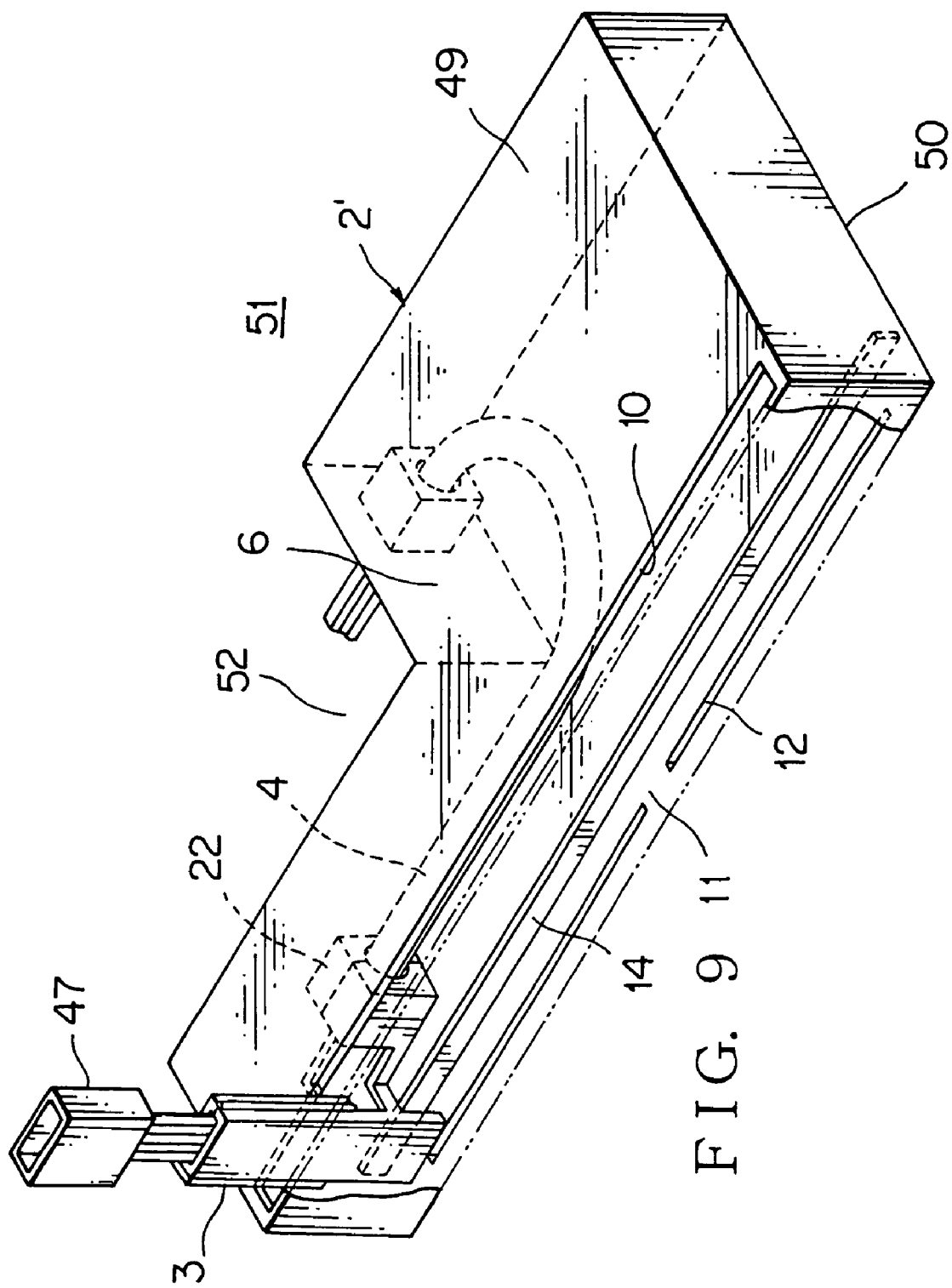
FIG. 9 is a perspective view of the feeder assembly of a sliding seat arranged in the horizontal position.
Figure 10:
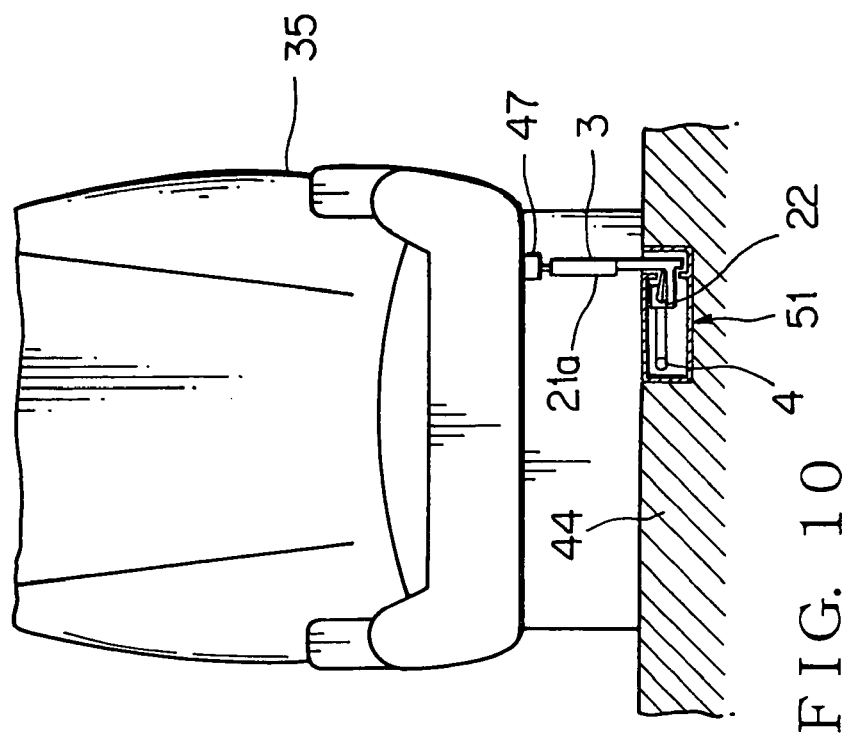
FIG. 10 is a front sectional view of the feeder assembly of a sliding seat arranged in the horizontal position at a vehicle floor.
Figure 11:
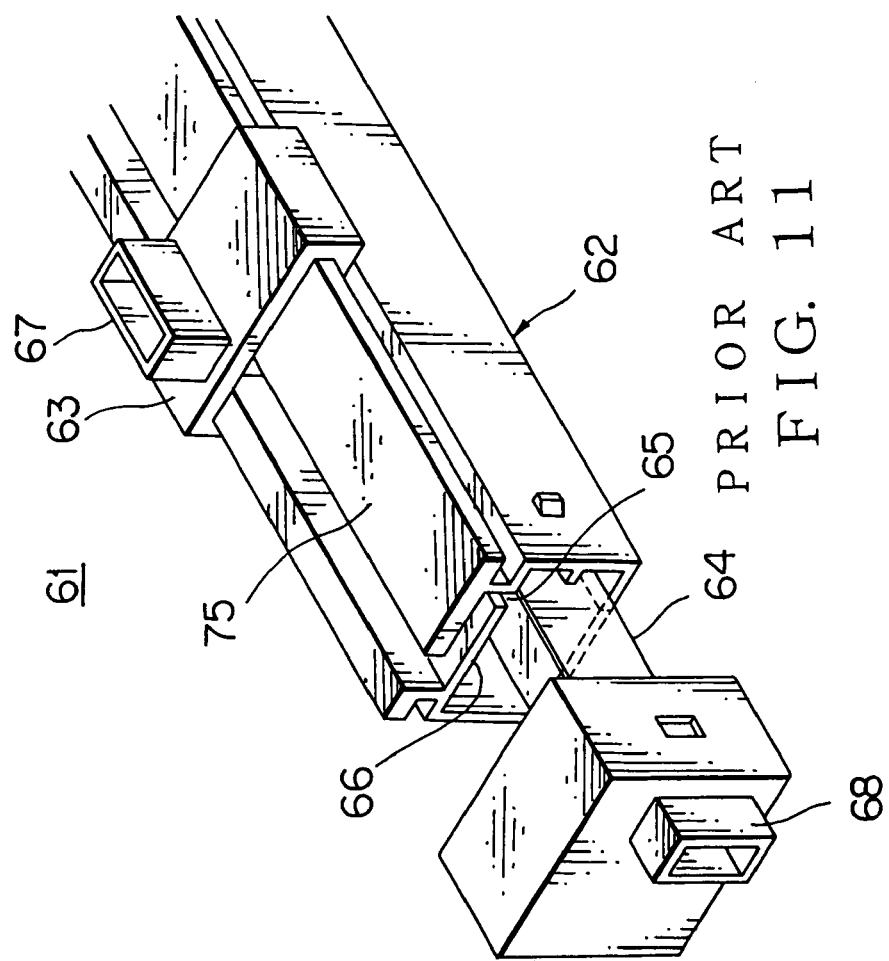
FIG. 11 is a perspective view showing a embodiment of a conventional feeder assembly of a sliding seat.
Figure 12:
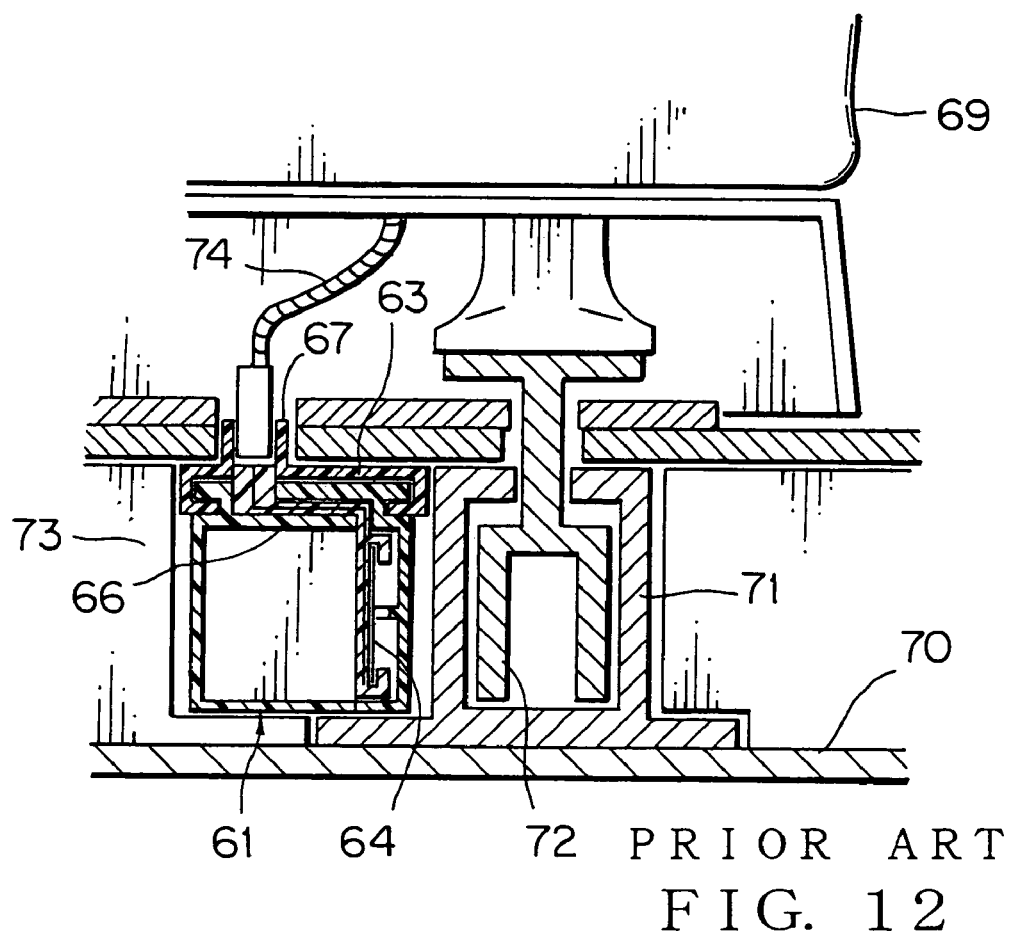
FIG. 12 is a front sectional view of installing a conventional feeder assembly of a sliding seat.

Although the above embodiment shows the vertical use of the feeder assembly, it is also possible to arrange the feeder assembly of the sliding seat 51 laid down on the floor as shown in FIGS. 9 and 10. The same function part of the embodiment in FIG. 1 is given the same numerals, and the explanation is omitted.

That is, an upper wall 49 and a lower wall 50 of the case 2' are formed widely and are parallel in height as shown in FIG. 9, the upper wall is provided with the first slit 10 for the insertion of the movable portion 3, the lower bottom wall (case bottom) of the slit 10 is provided with the foreign substance discharge hole 12, the vertical partition wall 14 for the foreign substance invasion protection is at least set up from the bottom wall 11, the partition wall 14 partitions (isolates) the harness receiving section 6 and the foreign substance discharge 9, and the second slit 16 for the insertion of the movable portion 3 of generally L- or T-shape character is disposed in the upper side of the partition wall 14. The basic structures of the case 2' and the movable portion 3 are the same as the embodiment of FIG. 1.

The feeder assembly 51 is placed on the level (horizontally) under the seat 35, the upper projection part (vertical part of the flat harness pathway) of the movable portion 3 is connected the seat side circuit.

Moreover, in the above each embodiment, the shape of the harness receiving section of the cases 2 and 2' is not limited to trapezoid or rectangle, it may be formed in the same height and width without cutout over the case (numeral 52 in FIG. 9).

Moreover, the form of the movable portion 3 can also be changed suitably. For example, the horizontal harness pathway 21b of the movable portion 3 of FIG. 3B may be connected directly with the harness holder 22 without bending it in L-shape. In that case, a hole is formed in the middle of the harness holder 22, and each electric wire 4a may be led from the hole to the harness insertion hole 23. Moreover, the harness pathway cover 25, and the split part 22a and 22b of the harness holder may be separated without using hinge. The feeder assembly 1 can also be disposed obliquely between vertical and horizontal position.

Moreover, if the quantity of the invading foreign substance is assumed to be little, the hole 12 for foreign substance discharge may not be necessary, and the foreign substance can be collected in the space 53 (FIG. 2) surrounded by the lower partition wall 14, the outside wall part (side wall) 13, and the bottom wall 11.

It is also possible to constitute that by arranging the feeder assembly back to front conversely, the dotted line of the harness 4 shows the advanced position of the seat 35 and the solid line of the harness 4 shows in the retreated position of the seat 35 in FIG. 7.

What is claimed is:

1. A feeder assembly of a sliding seat comprising a case having a harness receiving section, a movable portion moving along the case, and a wiring harness, bent in the harness receiving section, supported one end by the movable portion and the other end by the case, characterized in that a slit is formed in the case for the insertion of the movable portion, a foreign substance invasion space is formed between the slit and a case bottom, and the foreign substance invasion space is isolated from the harness receiving section by partition walls.

2. The feeder assembly described in claim 1, characterized in that the assembly further comprises a hole for discharging foreign substance disposed at the case bottom.

3. The feeder assembly described in claim 1, characterized in that the partition wall comprises each upper and lower partition wall and a second slit is formed between the upper and lower partition wall for the insertion of the movable portion.

4. The feeder assembly described in claim 1, characterized in that the movable portion comprises a harness pathway to make each electric wire of the wiring harness arrange flatly in parallel and a harness holder which bundles each electric wire in circular cross-section following the harness pathway.

5. The feeder assembly described in claim 1, characterized in that a clearance is disposed between the movable portion and the case so that the movable portion positions without or almost without contact of the case.

6. The feeder assembly described in claim 1, characterized in that the movable portion is connected to the sliding seat side, capable of moving freely in the slit to the perpendicular direction.

7. The feeder assembly described in claim 1, characterized in that a claw stabbed into a filler of a vehicle floor for fixing is disposed at both sides of the case in the width direction.

* * * * *